United States Patent
Negishi et al.

(10) Patent No.: US 7,356,780 B2
(45) Date of Patent: *Apr. 8, 2008

(54) USER INTERFACE SYSTEM, SCENE DESCRIPTION GENERATING DEVICE AND METHOD, SCENE DESCRIPTION CONVERTING DEVICE AND METHOD, RECORDING MEDIUM, AND SENDING MEDIUM

(75) Inventors: Shinji Negishi, Kanagawa (JP); Hideki Koyanagi, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 379 days.

This patent is subject to a terminal disclaimer.

(21) Appl. No.: 11/098,279

(22) Filed: Apr. 4, 2005

(65) Prior Publication Data

US 2005/0172233 A1 Aug. 4, 2005

Related U.S. Application Data

(63) Continuation of application No. 09/793,160, filed on Feb. 26, 2001, now Pat. No. 6,883,141.

(30) Foreign Application Priority Data

Feb. 29, 2000 (JP) ............................. 2000-055053

(51) Int. Cl.
*G06F 15/20* (2006.01)
*G06F 13/00* (2006.01)

(52) U.S. Cl. ..................................... 715/853; 715/733

(58) Field of Classification Search ........ 715/734–737, 715/719–720, 760, 763–765, 853–955; 709/209, 709/223

See application file for complete search history.

(56) References Cited

U.S. PATENT DOCUMENTS 6,486,892 B1 * 11/2002 Stern ........................... 715/760
6,611,262 B1 * 8/2003 Suzuki ......................... 345/419

* cited by examiner

*Primary Examiner*—Cao (Kevin) Nguyen
(74) *Attorney, Agent, or Firm*—Sonnenschein Nath & Rosenthal LLP

(57) ABSTRACT

A user interface system comprises a server having a scene description converting device for converting scene description containing input user interaction into converted scene description while leaving parts containing the user interaction and a scene description decoding device for decoding converted scene description into decoded scene description, a remote terminal having a scene description decoding device for decoding scene description and converted scene description sent from the server and a display device for displaying decoded scenes and a user input device for receiving user input according to this display, and a display terminal for displaying decoded scenes sent from the server. Thus, decoding can be enabled at terminals having inferior decoding capabilities and display capabilities.

2 Claims, 20 Drawing Sheets

FIG. 3

```
Group{                                      ←300: GROUPING OF ENTIRE SCENE
   children[                                ←301: START OF DESCRIPTION OF CHILDREN NODE
      Transform{                            ←302: GROUPING NODE FOR PERFORMING
         translation-300                          COORDINATES CONVERSION
         chidren[                           ←303: ORIGINAL POSITION FOR LOCAL
            DEF TOUCHS TouchSensor{ }             COORDINATES
            Shape{                          ←304: START DESCRIPTION OF CHILDREN NODE
               geometry Sphere{ }           ←305: SENSOR TO DETECT SELECTION OF USER
               appearance Appearance{       ←306: OBJECT TO DISPLAY
                  material Material{diffuseColor100}  ←307: SPHERE
               }                            ←308: SURFACE PROPERTIES OF OBJECT
            }                               ←309: PHYSICAL PROPERTIES OF SURFACE
         ]                                        OF OBJECT (COLOR, ETC.)
      }
      Transform{                            ←310:
         children[
            Shape{                          ←311:
               geometry Box{ }              ←312: CUBE
               appearance Appearance{       ←313:
                  material DEF MAT Material{ }  ←314:
               }
            }
~~         Transform{                       ←315:~~
~~            translation0-30~~
~~            children[~~
~~               Shape{                     ←316:~~
~~                  geometry Cone{ }        ←317: CONE~~
~~               }~~
~~            ]~~
~~         }~~
         ]
      }
      DEF TIMES TimeSensor{enabled TRUE}    ←318: SENSOR FOR GENERATING EVENT WITH
      DEF COL ColorInterpolator{                  PASSAGE OF TIME
         key      [0 1 ]                    ←319: LINEAR INTERPOLATION FOR RGB
         keyValue[000111]
      }
~~     Transform{                           ←320:~~
~~        translation300~~
~~        children[~~
~~           Shape{                         ←321:~~
~~              geometry Cylinder{ }        ←322: CYLINDER~~
~~           }~~
~~        ]~~
~~     }~~
   ]
}
ROUTE TOUCHS.touchTime TO TIMES.start Time         ←323: EVENT PROPAGATION OF SELECTED TIME
ROUTE TIMES.fraction_changed TO COL.set_fraction   ←324: EVENT PROPAGATION OF PASSED TIME
ROUTE COL.value_changed TO MAT.diffuseColor        ←325: EVENT PROPAGATION OF RGB
                                                         INTERPOLATION RESULTS
```

FIG. 9

```
Group{                                          ← 300: GROUPING OF ENTIRE SCENE
  children[                                     ← 301: START OF DESCRIPTION OF CHILDREN NODE
    Transform{                                  ← 302: GROUPING NODE FOR PERFORMING COORDINATES CONVERSION
      translation-300                           ← 303: ORIGINAL POSITION FOR LOCAL COORDINATES
      chidren[                                  ← 304: START DESCRIPTION OF CHILDREN NODE
        DEF TOUCHS TouchSensor{ }               ← 305: SENSOR TO DETECT SELECTION OF USER
        Shape{                                  ← 306: OBJECT TO DISPLAY
          geometry Sphere{ }                    ← 307: SPHERE
          appearance Appearance{                ← 308: SURFACE PROPERTIES OF OBJECT
            material Material{diffuseColor100}  ← 309: PHYSICAL PROPERTIES OF SURFACE OF OBJECT (COLOR, ETC.)
          }
        }
      ]
    }
    Transform{                                  ← 310:
      children[
        Shape{                                  ← 311:
          geometry Box{ }                       ← 312: CUBE
          appearance Appearance{                ← 313:
            material DEF MAT Material{ }        ← 314:
          }
        }
===========DEF REM1 Transform{===============================315:=
===================translation0-30====================
===================children[=========================
===============Shape{==============================316:=
===================geometry Cone{ }===================317: CONE=
==================}==============================
==================}==============================
==================]==============================
      ]
    }
    DEF TIMES TimeSensor{enabled TRUE}          ← 318: SENSOR FOR GENERATING EVENT WITH PASSAGE OF TIME
    DEF COL ColorInterpolator{                  ← 319: LINEAR INTERPOLATION FOR RGB
      key       [0 1 ]
      keyValue[000111]
    }
===========DEF REM2 Transform{===============================320:=
===================translation300====================
===================children[=========================
===============Shape{==============================321:=
===================geometry Cylinder{ }==============322: CYLINDER=
==================}==============================
==================}==============================
  ]
}
ROUTE TOUCHS.touchTime TO TIMES.startTime       ← 323: EVENT PROPAGATION OF SELECTED TIME
ROUTE TIMES.fraction_changed TO COL.set_fraction ← 324: EVENT PROPAGATION OF PASSED TIME
ROUTE COL.value_changed TO MAT.diffuseColor     ← 325: EVENT PROPAGATION OF RGB INTERPOLATION RESULTS
```

FIG. 13A
```
Transform{                    ←315:
  translation0-30
  children[
    Shape{                    ←316:
      geometry Cone{ }        ←317: CONE
    }
  ]
}
```
FIG. 13B
```
Transform{                    ←320:
  translation0-30
  children[
    Shape{                    ←321:
      geometry Cylinder{ }    ←322: CYLINDER
    }
  ]
}
```
FIG. 14A
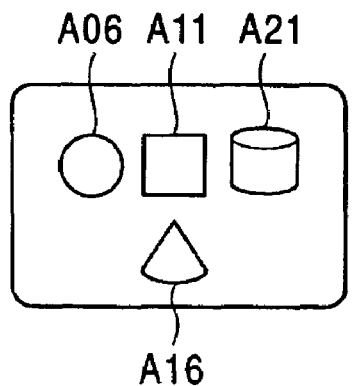
FIG. 14B
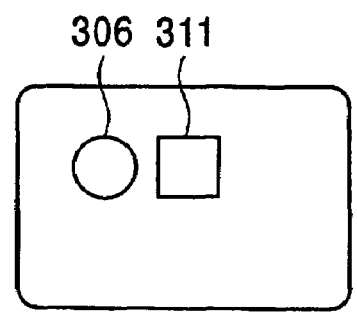

FIG. 16

```
Group{                                      ←300: GROUPING OF ENTIRE SCENE
  children[                                 ←301: START OF DESCRIPTION OF CHILDREN NODE
    Transform{                              ←302: GROUPING NODE FOR PERFORMING
      translation-300                             COORDINATES CONVERSION
                                            ←303: ORIGINAL POSITION FOR LOCAL
                                                  COORDINATES
      chidren[                              ←304: START DESCRIPTION OF CHILDREN NODE
        DEF TOUCHS TouchSensor( )           ←305: SENSOR TO DETECT SELECTION OF USER
        Shape{                              ←306: OBJECT TO DISPLAY
          geometry Sphere( )                ←307: SPHERE
          appearance Appearance{            ←308: SURFACE PROPERTIES OF OBJECT
            material Material{diffuseColor100}  ←309: PHYSICAL PROPERTIES OF SURFACE
          }                                         OF OBJECT (COLOR, ETC.)
        }
      ]
    }
    Transform{                              ←310:
      children[
        Shape{                              ←311:
          geometry Box( )                   ←312: CUBE
          appearance Appearance{            ←313:
            material DEF MAT Material( )    ←314:
          }
        }
    Transform{                              ←315:
      translation 0-30
      children[
        Shape{                              ←316:
          geometry Cone( )                  ←317: CONE
        }
      ]
    }
  ]
}
DEF TIMES TimeSensor{enabled TRUE}          ←318: SENSOR FOR GENERATING EVENT WITH
                                                  PASSAGE OF TIME
DEF COL ColorInterpolator{                  ←319: LINEAR INTERPOLATION FOR RGB
  key    [0 1 ]
  keyValue[000111]
}
Transform{                                  ←320:
  translation300
  children[
    Shape{                                  ←321:
      geometry Cylinder( )                  ←322: CYLINDER
    }
  ]
}
ROUTE TOUCHS.touchTime TO TIMES.start Time        ←323: EVENT PROPAGATION OF SELECTED TIME
ROUTE TIMES.fraction_changed TO COL.set_fraction  ←324: EVENT PROPAGATION OF PASSED TIME
ROUTE COL.value_changed TO MAT.diffuseColor       ←325: EVENT PROPAGATION OF RGB
                                                        INTERPOLATION RESULTS
```

```
Group{                                              ← 300: GROUPING OF ENTIRE SCENE
  children[                                         ← 301: START OF DESCRIPTION OF CHILDREN NODE
    Transform{                                      ← 302: GROUPING NODE FOR PERFORMING
                                                           COORDINATES CONVERSION
      translation-300                               ← 303: ORIGINAL POSITION FOR LOCAL
                                                           COORDINATES
      chidren[                                      ← 304: START DESCRIPTION OF CHILDREN NODE
        DEF TOUCHS TouchSensor{ }                   ← 305: SENSOR TO DETECT SELECTION OF USER
        Shape{                                      ← 306: OBJECT TO DISPLAY
          geometry Sphere{ }                        ← 307: SPHERE
          appearance Appearance{                    ← 308: SURFACE PROPERTIES OF OBJECT
            material Material{diffuseColor100}      ← 309: PHYSICAL PROPERTIES OF SURFACE
                                                           OF OBJECT (COLOR, ETC.)
          }
        }
      ]
    }
    Transform{                                      ← 310:
      children[
        Shape{                                      ← 311:
          geometry Box{ }                           ← 312: CUBE
          appearance Appearance{                    ← 313:
            material DEF MAT Material{ }            ← 314:
          }
        }
        Transform{                                  ← 315:
          translation0-30
          children[
            Shape{                                  ← 316:
              geometry Cone{ }                      ← 317: CONE
            }
          ]
        }
      ]
    }
    DEF TIMES TimeSensor{enabled TRUE}              ← 318: SENSOR FOR GENERATING EVENT WITH
                                                           PASSAGE OF TIME
    DEF COL ColorInterpolator{                      ← 319: LINEAR INTERPOLATION FOR RGB
      key    [0 1 ]
      keyValue[000111]
    }
    Transform{                                      ← 320:
      translation300
      children[
        Shape{                                      ← 321:
          geometry Cylinder{ }                      ← 322: CYLINDER
        }
      ]
    }
  ]
}
ROUTE TOUCHS.touchTime TO TIMES.start Time          ← 323: EVENT PROPAGATION OF SELECTED TIME
ROUTE TIMES.fraction_changed TO COL.set_fraction    ← 324: EVENT PROPAGATION OF PASSED TIME
ROUTE COL.value_changed TO MAT.diffuseColor         ← 325: EVENT PROPAGATION OF RGB
                                                           INTERPOLATION RESULTS
```

USER INTERFACE SYSTEM, SCENE DESCRIPTION GENERATING DEVICE AND METHOD, SCENE DESCRIPTION CONVERTING DEVICE AND METHOD, RECORDING MEDIUM, AND SENDING MEDIUM

CROSS REFERENCE TO RELATED APPLICATIONS

The present application is a continuation of co-pending U.S. application Ser. No. 09/793,160, filed on Feb. 26, 2001, which claims priority to Japanese Application No. 2000-055053, filed Feb. 29, 2000, both of which are incorporated herein by reference to the extent permitted by law.

BACKGROUND OF THE INVENTION

1. Field of the Invention

The present invention relates to a user interface which uses scene description information, a scene description information generating device and method for generating scene description information, a scene description information converting device and method for converting scene description information, and a sending medium for sending scene description information and a recording medium for recording scene description information.

2. Description of the Related Art

There are contents described with scene description enabling interaction by user input, such as digital TV broadcasting and DVD (Digital Video/Versatile Disk), Internet home pages described with HyperText Markup Language (hereafter referred to as "HTML") or the like, Binary Format for the Scene (hereafter referred to as "MPEG-4 BIFS") which is a scene description format stipulated in ISO/IEC14496-1, Virtual Reality Modeling Language (hereafter referred to as "VRML") which is stipulated in ISO/IEC14472, and so forth. The data of such contents will hereafter be referred to as "scene description". Scene description also includes the data of audio, images, computer graphics, etc., used within the contents.

FIGS. 18 through 20 illustrate an example of scene description, taking VRML as an example.

FIG. 18 illustrates the contents of scene description. With VRML, scene description is text data such as shown in FIG. 18, and MPEG-4 BIFS scene description is the text data that has been encoded to binarized data. VRML and MPEG-4 BIFS scene description is represented by basic description units called nodes. In FIG. 18, nodes are underlined. Nodes are units for describing objects and the linkage relation of objects and the like, containing data called fields for illustrating the properties and attributes of the nodes. For example, the Transform node 302 in FIG. 18 is a node capable of specifying three-dimensional coordinates conversion, and the amount of parallel movement of the point of origin of the coordinates can be specified in the Translation filed 303. There are also fields capable of specifying other nodes, so the configuration of the scene description has a tree configuration such as shown in FIG. 19. In FIG. 19, the ovals represent nodes, dotted lines between the nodes represent event propagation paths, and solid lines between the nodes represent the parent-child relations of the nodes. A node which represents a field of the parent node thereof is called a child node. For example, in the Transform node 302 in FIG. 18, there is a Children field 304 indicating a child node group which is subjected to coordinates conversion by the Transform node, and the TouchSensor node 305 and Shape node 306 are grouped as children nodes. A node which thus groups child nodes to a Children filed is called a grouping node. In the case of VRML, a grouping node is a node defined in ISO/IEC14772-1 Section 4.6.5, and indicates a node having a field comprising a list of nodes.

That is, a grouping node has a field containing a list of children nodes. Each grouping node defines a positional space for children. This positional space relates to the positional space of the nodes wherein grouping nodes are children. Such a node is referred to as a parent node. This means that conversion descends the scene chart hierarchy. As defined in ISO/IEC14772-1 Section 4.6.5. There are special exceptions wherein the field name is not Children, but in the following description, the Children field will be understood to encompass such exceptions as well.

In order to position an object to be displayed within a scene, the node representing the object is grouped along with a node representing attributes, and further grouped with a node indicating positional location. The object which the Shape node 306 in FIG. 18 represents has parallel movement specified by the Transform node 302 which is the parent node thereof applied thereto, and positioned in the scene. The scene description in FIG. 18 contains a Sphere node 307 representing a sphere, a Box node 312 representing a cube, a cone node 317 representing a cone, and a Cylinder node 322 representing a cylinder, with the results of decoding and displaying the scene description being such as shown in FIG. 20.

The scene description may also contain user interaction. The ROUTE shown in FIG. 18 represents propagation of events. The ROUTE 323 indicates that in the event that the TouchTime field of the TouchSensor node 305 to which an identifier called TOUCHS has been appropriated changes, the value thereof is propagated as an event to the StartTime field of the TimeSensor node 318 to which an identifier called TIMES has been appropriated. In the event that the user has selected the Shape node 306 which has been grouped with the Children field 304 of the Transform node 302 which is the parent node of the TouchSensor node 305, the TouchSensor node 305 outputs the selected time as a TouchTime event. A sensor which is grouped with and works with a Shape node attached thus by a grouping node will be referred to as a Sensor node. A Sensor node is what ISO/IEC14772-1 Section 4.6.7.3 calls Pointing-device sensors, and attached Shape nodes are Shape nodes grouped with the parent node of a Sensor node. That is, a Pointing-device sensor is for detecting a pointing event wherein the user clicks on a shape such as a touch sensor, for example.

On the other hand, for one second from startTime, the TimeSensor node 318 outputs the elapsed time as a fraction_changed event. The fraction_changed event which represents the elapsed time output from the TimeSensor node 318 is propagated by the ROUTE 324 to the set_fraction field of the ColorInterpolator node 319 to which an identifier called COL has been appropriated. The ColorInterpolator node 319 has functions for linear interpolation of RGB color-space values. The key and keyValue fields of the ColorInterpolator node 319 represent that in the event that the value of the set_fraction field which is input is 0, event output of the RGB value [000] as value_changed is made, and that in the event that the value of the set_fraction field which is input is 1, event output of the RGB value [111] as value_changed is made. In the event that the value of the set_fraction field which is input is between 0 and 1, event output of a value subjected to linear interpolation of the RGB value between [000] and [111], as value_changed, is made. That is to say, in the event that the value of the input set_fraction field which is input is 0.2, there is event output of the RGB value [0.2 0.2 0.2] as value_changed. The value value_changed as the results of linear interpolation is propagated by the ROUTE 325 to the diffuseColor field of the Material node 314 to which has been appropriated an identifier called MAT. This diffuseColor represents the diffusion color of the object surface which the Shape node 311 to which the Material node 314 belongs represents. Event propagation by the above ROUTE 323, ROUTE 324, and ROUTE 325 realizes user interaction wherein the RGB values of a displayed cube change from [000] to [111] for one second immediately following the user selecting the displayed sphere.

FIG. 21 shows an example of a system for viewing and listening to scene descriptions of contents described with a scene description method enabling including interaction by user input, such as digital TV broadcasting and DVD, Internet home pages described with HTML, MPEG-4 BIFS, VRML, and so forth.

The server C01 takes the scene description C00 as input, and in the event that the server itself comprises a decoding device for scene description, the scene description C00 is decoded and displayed on the display terminal C13. Examples of the server C01 include a scene description re-distributing device or home server, digital TV broadcast setup box, personal computer, and so forth. Normally, a user input device C09 such as a mouse or keyboard is used to enable user input for a scene description containing user interaction. There are also cases wherein scene description is distributed to an external remote terminal C07. At this time, the remote terminal C07 may not necessarily have sufficient decoding capabilities and display capabilities for the scene description, and also there is the problem that sufficient sending capacity may not be secured for distribution.

The remote terminal C07 may have capabilities as a user input device. In such cases, the user input information C11 which has been input on the remote terminal C07 is transmitted to the server C01, reflected in the decoding of the scene description at the server C01, and consequently the decoded scene C12 which reflects the user input is also displayed on the display terminal C13.

FIG. 22 shows the configuration of a user interface system comprising the remote terminal having user input capabilities shown in FIG. 21.

In the event that the server D01 comprises a scene description decoding device D04, the scene description input D00 is decoded and the decoded scene D12 is displayed on the display terminal D13. On the other hand, the server D01 transmits the scene description D00 to the remote terminal D07 via the transmitting/receiving device D06. The scene description D00 may be temporarily stored in the scene description storing device D05.

The remote terminal D07 receives the scene description D00 with the transmitting/receiving device D06b, decodes with the scene description decoding device D04b, and displays with the display device D08. The scene description D00 may be temporarily stored in the scene description storing device D05b. In the event that the remote terminal D07 has user input functions, the remote terminal D07 accepts user input D10 from the user input device D09, and sends this as user input information D11 representing user-selected position and the like to the scene description decoding device D04b. The scene description decoding device D04b decodes the scene description D00 based on the user input information D11, thereby displaying decoded results reflecting the user input on the display device D08. On the other hand, the remote terminal D07 may transmit the user input information D11 to the server D01 via the transmitting/receiving device D06b. In the event that the server D01 comprises a scene description decoding device D04, the scene description decoding device D04 of the server D01 decodes the scene description D00 based on the user input information D11, thereby displaying decoded scene D12 reflecting the user input D10 on the display device D13.

With regard to viewing and listening to contents described with a scene description method enabling including interaction by user input, such as digital TV and DVD, Internet home pages described with HTML and the like, MPEG-4 BIFS, VRML, and so forth, there is demand for arrangements wherein decoding and display can be performed on terminals with inferior decoding capabilities and display capabilities. At the time of re-distribution with low-capacity media, there has also been the problem that scene descriptions with large data could not be sent, or required sending media with large capacity.

Also, with regard to viewing and listening to contents comprising scene description containing user interaction, there has been the need for the user to operate an input device such as a mouse toward the screen (in the case of TV). Or, in the case of receiving with a PC, the user has had to sit by the screen and operate a keyboard or mouse. Accordingly, a user interface system could be conceived wherein all contents are displayed on the remote terminal for the user to make input on the remote terminal, but a great deal of the contents usually are not directly related to user input, and transmitting all of this data to the user terminal would necessitate great sending capacity for sending to the remote terminal, and further require high decoding capabilities and display capabilities for the remote terminal.

SUMMARY OF THE INVENTION

In order to solve the above problems, a first aspect of the present invention is a user interface system using scene description information including user interaction, comprising: a server having converting means for converting scene description information; and a remote terminal having decoding means for decoding scene description information and display means for displaying scenes; wherein the server sends scene description information converted by the converting means thereof to the remote terminal, and the remote terminal decodes with the decoding means thereof and displays on the display means thereof, the converted scene description information.

According to a second aspect of the present invention, a scene description generating device for generating scene description information including user interaction comprises encoding means for encoding the scene description information with an identifier whereby judgment can be made regarding portions to be left and portions to be deleted at the time of converting the generated scene description information later.

According to a third aspect of the present invention, a scene description generating device for generating scene description information including user interaction comprises encoding means for outputting beforehand other scene description information regarding portions to be left and portions to be deleted at the time of converting the scene description information later.

According to a fourth aspect of the present invention, a scene description generating method for generating scene description information including user interaction comprises an encoding step for encoding the scene description information with an identifier whereby judgment can be made regarding portions to be left and portions to be deleted at the time of converting the generated scene description information later.

According to a fifth aspect of the present invention, a scene description generating method for generating scene description information including user interaction comprises an encoding step for outputting beforehand other scene description information regarding portions to be left and portions to be deleted at the time of converting the generated scene description information later.

According to a sixth aspect of the present invention, a scene description converting device for converting scene description information including user interaction comprises converting means wherein scene description information encoded including an identifier whereby portions to be left and portions to be deleted can be judged is input, and selection of the scene description information is made based on the identifier, thereby performing conversion.

According to a seventh aspect of the present invention, a scene description converting device for converting scene description information including user interaction comprises converting means wherein scene description information regarding which portions to be left and portions to be deleted have been separated is input, the converting means performing converting by selecting the portions to be left and portions to be deleted.

According to an eighth aspect of the present invention, a scene description converting method for converting scene description information including user interaction comprises a converting step wherein scene description information encoded including an identifier whereby portions to be left and portions to be deleted can be judged is input, and selection is made based on the identifier, thereby performing conversion.

According to a ninth aspect of the present invention, a scene description converting method for converting scene description information including user interaction comprises a converting step wherein scene description information regarding which portions to be left and portions to be deleted have been separated is input, the converting step performing converting by selecting the portions to be left and portions to be deleted.

According to a tenth aspect of the present invention, a sending medium sends scene description information including user interaction, wherein scene description information encoded during scene description with an identifier whereby portions to be left and portions to be deleted can be judged is sent.

According to an eleventh aspect of the present invention, a sending medium sends scene description information including user interaction, wherein scene description information wherein portions to be left and portions to be deleted have been separated beforehand is sent.

According to a twelfth aspect of the present invention, a recording medium sends scene description information including user interaction, wherein scene description information encoded during scene description with an identifier whereby portions to be left and portions to be deleted can be judged is recorded.

According to a thirteenth aspect of the present invention, a recording medium sends scene description information including user interaction, wherein scene description information wherein portions to be left and portions to be deleted have been separated beforehand is recorded.

That is to say, according to the present invention, at the time of viewing and listening to contents described with a scene description method enabling including interaction by user input, such as digital TV and DVD, Internet home pages described with HTML and the like, MPEG-4 BIFS, VRML, and so forth, conversion is performed for extracting only partial scene description relating to user interaction from the scene description input containing user interaction, thereby enabling decoding and display on terminals with inferior decoding capabilities and display capabilities.

Performing conversion which leaves parts relating to user interaction enables application as scene description to be transmitted to a remote terminal having user input functions in a user interface system.

Also, according to the present invention, generating scene description beforehand by assuming that conversion of scene description according to the present invention will be performed later allows the contents of scene description following scene description conversion to be controlled at the stage of generating the scene description.

Further, clearly specifying the parts to be extracted at the time of conversion when generating the scene description not only facilitates scene description conversion, but also enables arbitrary parts to be extracted regardless of interaction.

Also, separately distributing the scene description data for the remote terminal extracted beforehand at the time of generating the scene description does away with the need for extracting processing at the receiving side.

BRIEF DESCRIPTION OF THE DRAWINGS

FIG. 3 is a diagram illustrating the scene description contents before and after scene description conversion;

FIG. 9 is a diagram illustrating the scene description contents before and after scene description conversion corresponding to the fourth embodiment;

FIG. 13 is a diagram illustrating scene description according to the fifth embodiment;

FIG. 14 is a diagram illustrating the scene description decoding and display results corresponding to the fifth embodiment;

FIG. 16 is a diagram illustrating the contents of scene description corresponding to a sixth embodiment;

FIG. 18 is a diagram illustrating the contents of scene description;

DESCRIPTION OF THE PREFERRED EMBODIMENTS

Figure 1:
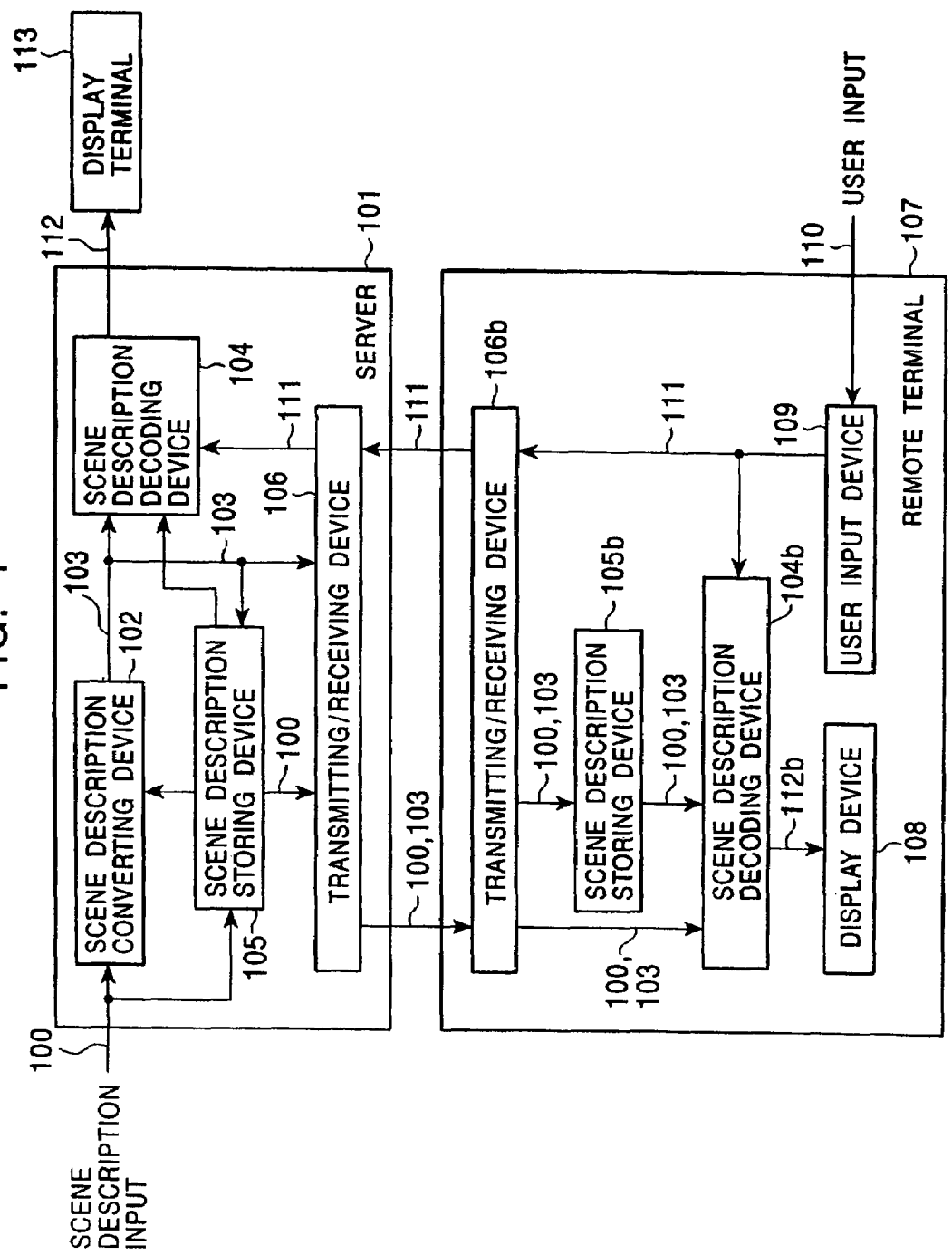
FIG. 1 is a block diagram representing a scene description audio-visual system to which a scene description converting device has been applied.

First, a user interface system using scene description information containing user interaction will be described with reference to FIG. 1 as a first embodiment of the present invention.

This user interface system is made up of a server 101, a remote terminal 107 for displaying decoded scenes 112b and also receiving user input 110, and a display terminal 113 for displaying decoded scenes 112.

The server 101 has a scene description converting device 102 for converting scene description 100, which is input scene description information, into converted scene description 103, a scene description storing device 105 for storing input scene description 100 or converted scene description 103 from the scene description converting device 102 and sending this to the scene description converting device 102 or a scene description decoding device 104, and a scene description decoding device 104 for decoding scene description 100 or converted scene description 103 from the scene description converting device 102 or a scene description storing device 105 into converted scene description 112, and sending this to a display terminal 113.

Also, the server 101 has a transmitting/receiving device 106 for transmitting scene description 100 or converted scene description 103 from the scene description storing device 105 or scene description converting device 102 to the remote terminal 107, and for receiving user input information 111 from the remote terminal 107 and sending this to the scene description decoding device 104.

The remote terminal 107 has a display device 108 for displaying the decoded scenes 112b, a user input device 109 of receiving user input 110 according to this display, and a scene description decoding device 104b for decoding scene description 100 or converted scene description 103 according to the user input information 111 from the user input device 109.

Also, the remote terminal 107 has a scene description storing device 105b for storing and sending scene description 100 or converted scene description 103 to the scene description decoding device 104b, and a transmitting/receiving device 106b for receiving scene description 100 or converted scene description 103 from the server 101 and sending this to the scene description decoding device 104b and scene description storing device 105, and for sending user input information 111 from the user input device 109 to the server 101.

The display terminal 113 displays converted scenes 112 sent from the server 101.

Figure 22:
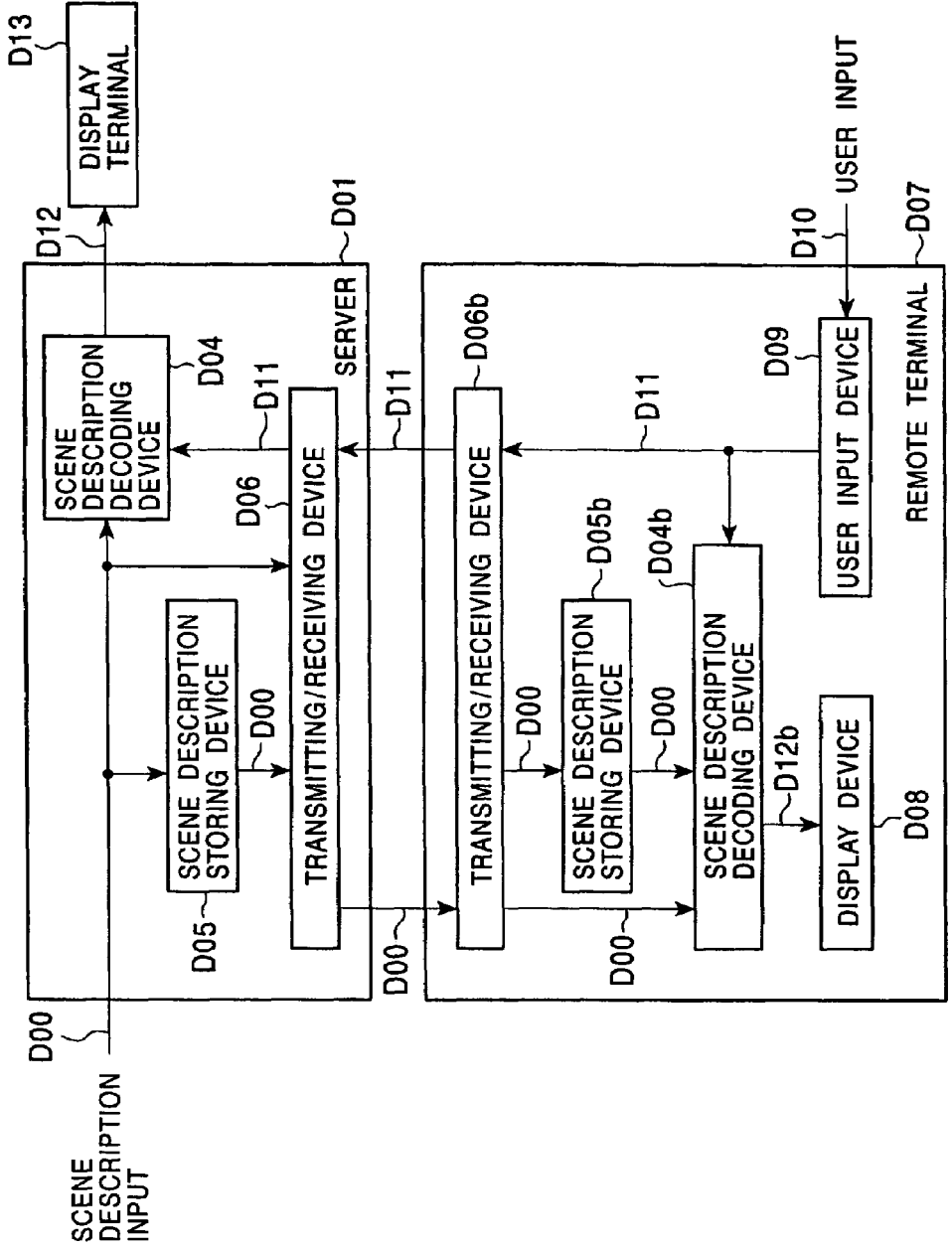
FIG. 22 is a block diagram illustrating the system configuration at the time of viewing and listening to conventional scene description corresponding to FIG. 21.

The first embodiment is the scene description converting device 102 according to the present embodiment applied to the user interface system at the time of viewing and listening to scene description, shown in FIG. 22.

The scene description converting device 102 takes scene description 100 as the input thereof and extracts parts in the scene description related to user interaction, thereby outputting converted scene description 103. The input and output scene description 100 and 103 of the scene description converting device 102 may be stored in the scene description storing device 105.

In the event that the server 101 has a scene description decoding device 104, the scene description input 100 or converted scene description 103 can be decoded and displayed with the display terminal 113.

The server 101 transfers the converted scene description 103 to the remote terminal 107 via the transmitting/receiving device 106. The amount of data of the has been cut down by the scene description converting device 102 according to the present embodiment, so sending capacity lower than that of the conventional art suffices for the sending path from the server 101 to the remote terminal 107.

The remote terminal 107 decodes the converted scene description 103 received from the server 101 with the scene description decoding device 104b and displays this with the display device 108. Parts unrelated to user interaction in scene description have been deleted beforehand by the scene description converting device 102 according to the present embodiment, so the scene description decoding device 104b can decode scene description with decoding capabilities lower than what would be necessitated for decoding the scene description input 100 without change. Further, the display device 108 is capable of display with display capabilities lower than what would be necessitated for displaying the scene description input 100 without change.

In the event that the remote terminal 107 has a user input device 109, decoding and display of the scene description reflecting the user input 110 is performed by sending the user input 110 as user input information 111 regarding such as, for example, what position the user has selected, to the scene description decoding device 104b. The scene description converting device 102 according to the present embodiment saves and converts scene description relating to user interaction, and thus user interaction the same as the scene description input 100 can be performed at the remote terminal 107.

At the time of reflecting the user input 110 on the remote terminal 107 in the scene description decoding at the server 101 side as well, the remote terminal 107 transmits user input information 111 to the server 101 via the transmitting/receiving device 106b. The scene description decoding device 104 of the server 101 decodes the scene description based on the received user input information 111, thereby enabling converted scenes 112 reflecting the user input 110 on the display terminal 113. The scene description converting device 102 according to the present embodiment saves and converts scene description relating to user interaction, and thus user input 110 made to the converted scene description 103 on the remote terminal 107 can be used without change for decoding of the scene description input 100 on the server 101.

Incidentally, though not shown in the drawings, there are cases wherein the user input information 111 is converted into information regarding which object in the scene description has been selected, by the scene description decoding device 104b of the remote terminal 107, and then sent to the server.

The scene description converting device 102 according to the present embodiment extracts parts within the scene description related to user interaction, and deletes parts not related to user interaction. The conversion procedures will be described with reference to FIG. 2, with an example of MPEG-4 BIFS and VRML.

First, in step S201, data representing propagation of events comprising user interaction in the scene description are not deleted but left. In the case of MPEG-4 BIFS or VRML, the nodes used for the ROUTE representing propagation of events are not deleted but left. ROUTE is not deleted.

With scene description comprising a tree structure as with MPEG-4 BIFS or VRML, an effective tree structure must be saved even after data representing propagation of events comprising user interaction has been extracted, so subsequently, judgment is made from the top of the tree structure of the scene description toward the end thereof, regarding whether to leave or delete nodes.

A parent node of a node which has been determined to be left in step S202 is always left.

In step S203, in the event that the node regarding which judgment is to be made is a node representing a Children field of a grouping node, the flow proceeds to step S204. Otherwise, the flow proceeds to step S206.

In step S204, in the event that the node regarding which judgment is to be made is a Children field of a grouping node, judgment is made in step S205 that this can be deleted in the event that it is not a Shape node attached to a Sensor node which has been judged to be let due to being used by ROUTE in step S201.

For example, the TouchSensor node is a Sensor for detecting whether or not the user has selected a Shape node grouped with a parent node, so in order to save the functions of the TouchSensor, it is necessary to save the attached Shape node.

In step S206, in the event that the node regarding which judgment is to be made is not a Children field of a grouping node, judgment is made in step S207 that this can be deleted in the event that the parent node is to be deleted.

In step S208, in the event that all nodes have been subjected to judgment of whether to delete or leave the nodes, the flow ends. In the event that there are nodes not yet judges, the flow proceeds to step S209.

In step S209, the object of judgment is shifted to the nodes not yet judges, and the flow is repeated from step S202 again.

Incidentally, in steps S205 and 207, nodes regarding which judgment has been made that the nodes can be deleted, do not necessarily have to be deleted. For example, in the event that sufficient deletion has been made with regard to the sending capacity of the sending medium used for sending the converted scene description, and for the capabilities of the scene description decoding device and display device, no further nodes need to be deleted.

Figure 2:
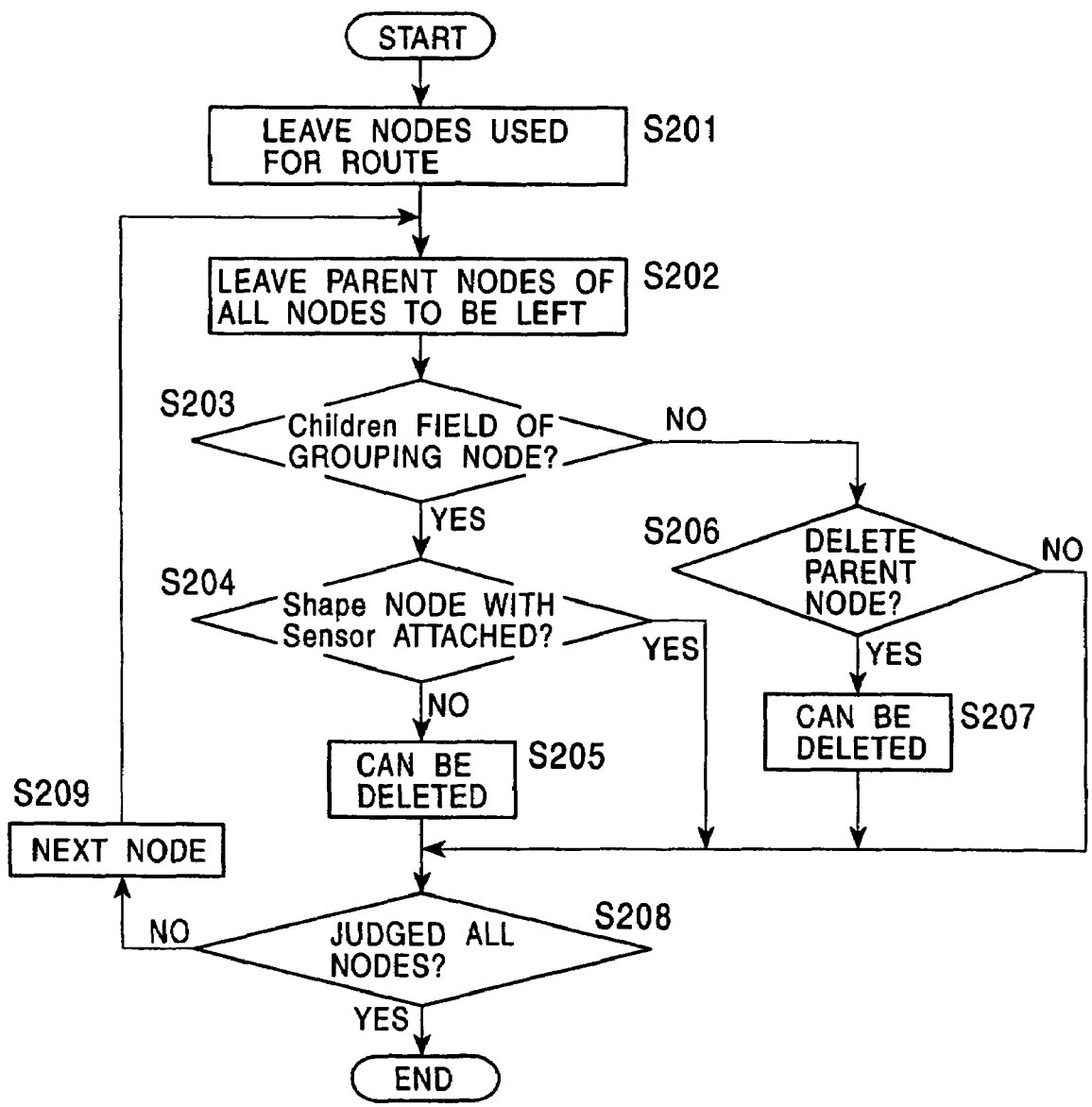
FIG. 2 is a flowchart illustrating scene description converting procedures for MPEG-4 BIFS and VRML.
Figure 4:
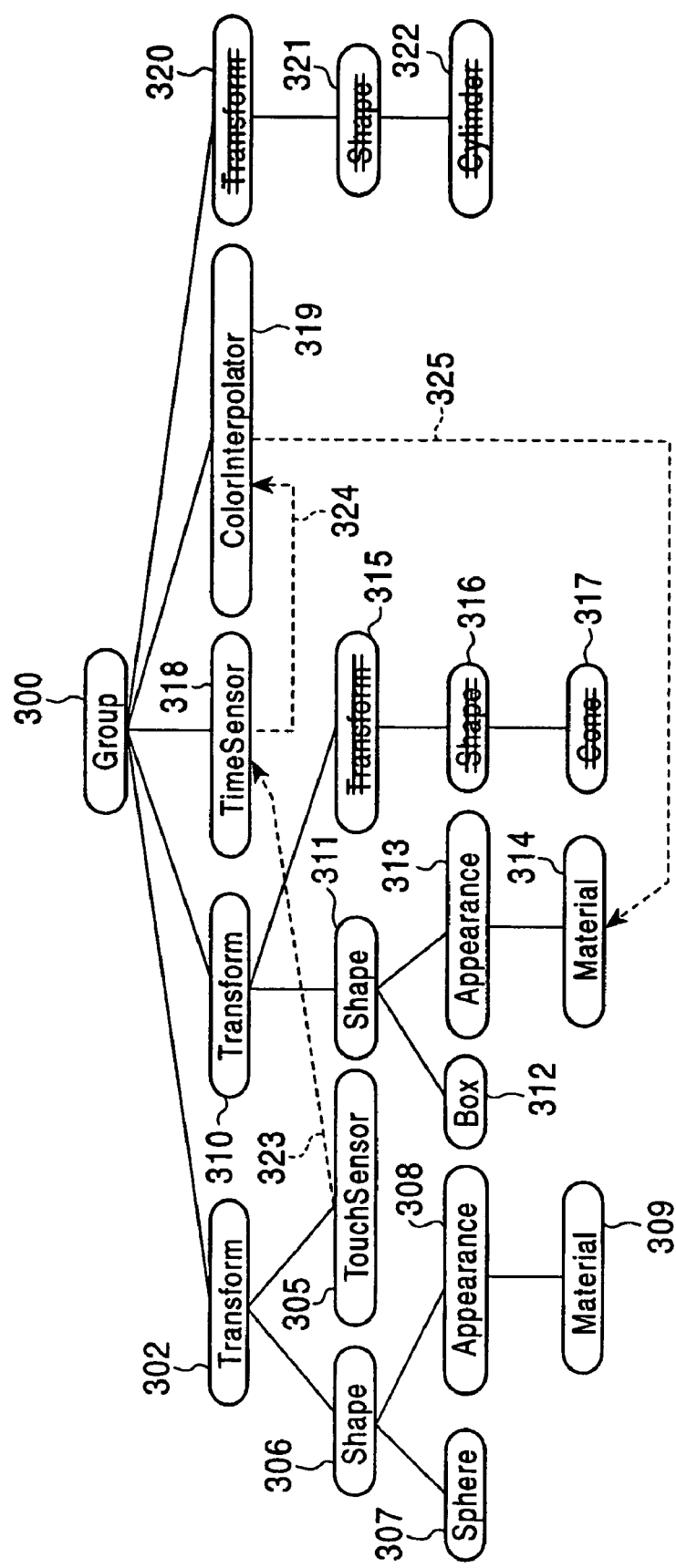
FIG. 4 is a diagram illustrating the scene description structure before and after scene description conversion.
Figure 5:
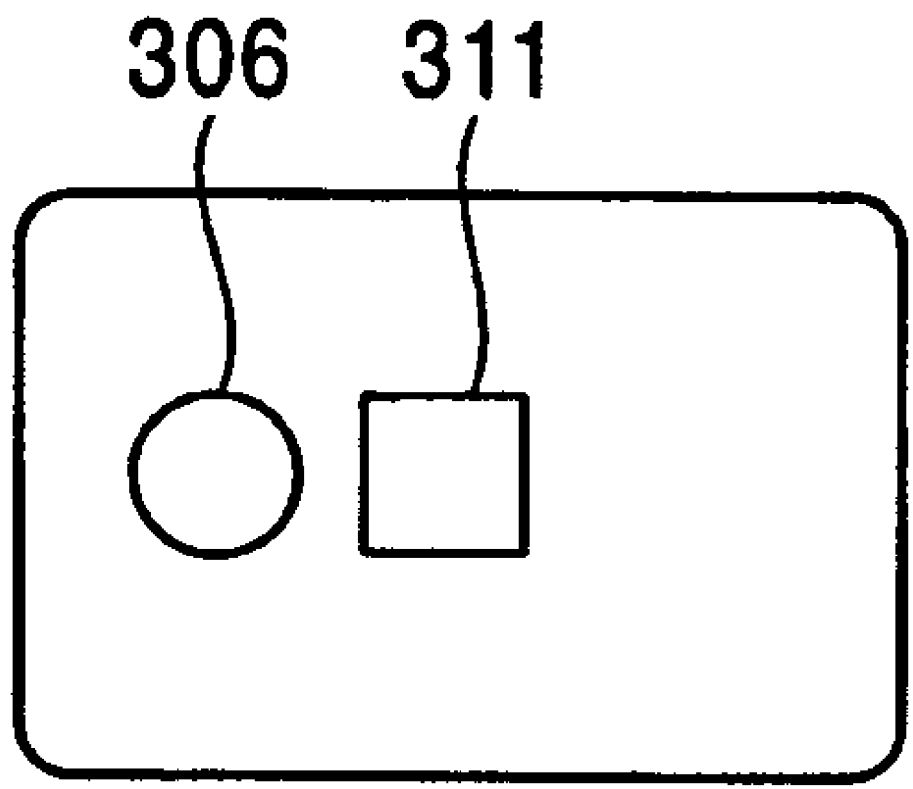
FIG. 5 is a diagram illustrating decoding and display results of converted scene description.

FIGS. 3 through 5 show an example of converting the scene description with the processing procedures shown in FIG. 2. The scene description before and after conversion shown in FIG. 3 is VRML, and the scene description is subjected to encoding into binary data with MPEG-4 BIFS. For the sake of description, an example of converting the same scene description as that shown in FIG. 18 is given here. The parts to be deleted by conversion are struck through with double lines.

FIG. 4 illustrates the scene description structure before and after conversion. First, due to the procedure step S201 shown in FIG. 2, decision has been made to leave the TouchSensor node 305 used with ROUTE, the TimeSensor node 318, the ColorInterpolator node 319, and the Material node 314. Next, due to the procedure step S202, decision has been made to leave the Transform node 302, Group node 300, Appearance node 313, Shape node 311, and Transform node 310, which are parent nodes of the above nodes regarding which leaving has been decided. Subsequently, decision is made from the top of the tree structure of the scene description toward the end thereof, regarding whether to leave or delete nodes. The unjudged Shape node 306 is a Children field of the Transform node 302 which is a grouping node and also the TouchSensor node is attached, so decision is made not to delete. The Sphere node 307 and Appearance node 308 which are children nodes of the Shape node 306, and further the Material node 309 which is a grandchild node thereof, do not have their parent nodes deleted in step S206, and according decision is made not to delete these nodes.

The Box node 312 is not a child of a grouping node and the Shape node 311 which is the parent node thereof has been decided to not be deleted, so the decision is made not to delete the Box node 312. The Transform node 315 is a child field of the Transform node 310 which is a grouping node, but there is no Sensor attached, and accordingly judgment is made in step S205 that this can be deleted. The shape node 316 which is a child node thereof and the further child node Cone node 317 are judged in step S207 that deletion may be made. In the same manner, making judgement with the procedures shown in FIG. 2 decides that the Transform node 320, Shape node 321, and Cylinder node 322 can be deleted.

Consequently, the decoding and display results of the converted scene description are, as shown in FIG. 5, only a sphere and cube.

According to the converting method of the present embodiment, the parts relating to user interaction in the scene description are saves, so the user interaction wherein the color of the cube 311 consecutively changes from RGB=[000] to RGB=[111] for one second after the user selecting the sphere 306 is saved even after conversion.

The scene description converting device according to the present embodiment is equally valid regarding the function of leaving parts relating to user interaction for scene description input other than VRML and MPEG-4 BIFS as well, and is by no means restricted to VRML and MPEG-4 BIFS.

A user interface system will be described as a second embodiment of the present invention, with reference to FIG. 6.

This user interface system comprises a server 401, and a remote terminal 407 for displaying decoded scenes 412b and also receiving user input 410.

The server 401 comprises a scene description converting device 402 for converting scene description 400 which is input scene description information into converted scene description 403, a scene description storing device 405 for storing input scene description 400 and converted scene description 403 from the scene description converting device 402 and sending it to the scene description converting device 402, and a transmitting device 406 for transmitting the scene description 400 and converted scene description 403 from the scene description converting device 402 and scene description storing device 405 to the remote terminal 407.

The remote terminal 407 has a display device 408 for displaying decoded scenes 412b, a user input device 409 for receiving user input 410 according to this display, and a scene description decoding device 404b for decoding scene description 400 and converted scene description 403 according to user input information 411 from the user input device 409.

Also, the remote terminal 407 has a scene description storing device 405b for storing and sending scene description 400 or converted scene description 403 to the scene description decoding device 404b, and a receiving device 406b for receiving scene description 400 or converted scene description 403 from the server 401 and sending this to the scene description decoding device 404b and scene description storing device 405b.

The difference with the first embodiment is that the server 401 itself does not comprise a scene description decoding device; rather, the scene description re-distributing system is arranged such that the converted scene description converted by the scene description converting device 402 us re-distributed to the remote terminal 407. The scene description converting device 402 is the same as that in the first embodiment.

Figure 6:
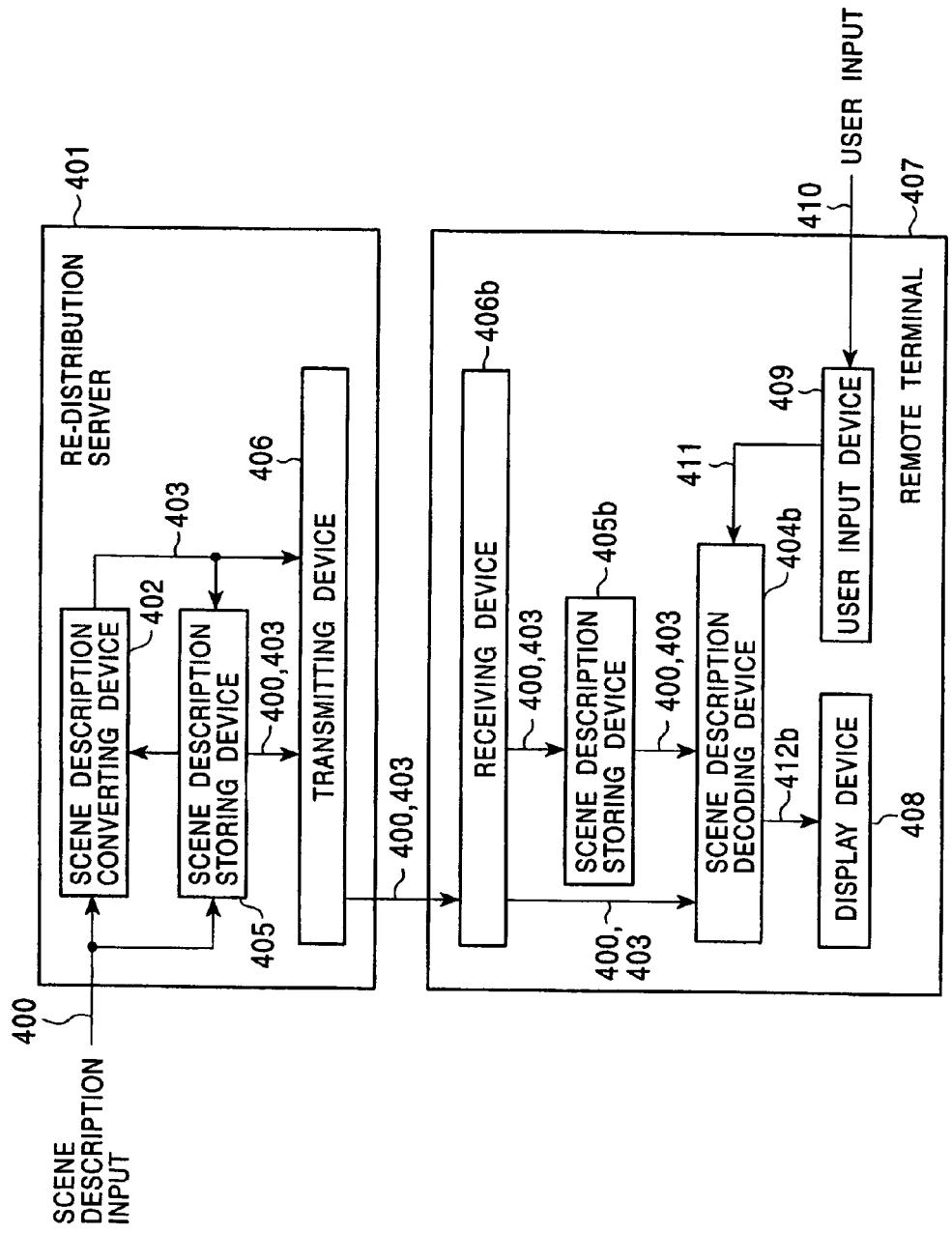
FIG. 6 is a block diagram illustrating a re-distribution system of scene description corresponding to a second embodiment.

As shown in FIG. 6, converting the scene description 400 with the re-distribution server 401 by the scene description converting device 402 according to the present embodiment and then re-distributing it allows the sending capacity at the time of re-distribution to be suppressed to a low level, and further enables decoding and displaying of scene description with the remote terminal 407 having inferior decoding capabilities and display capabilities.

Figure 7:
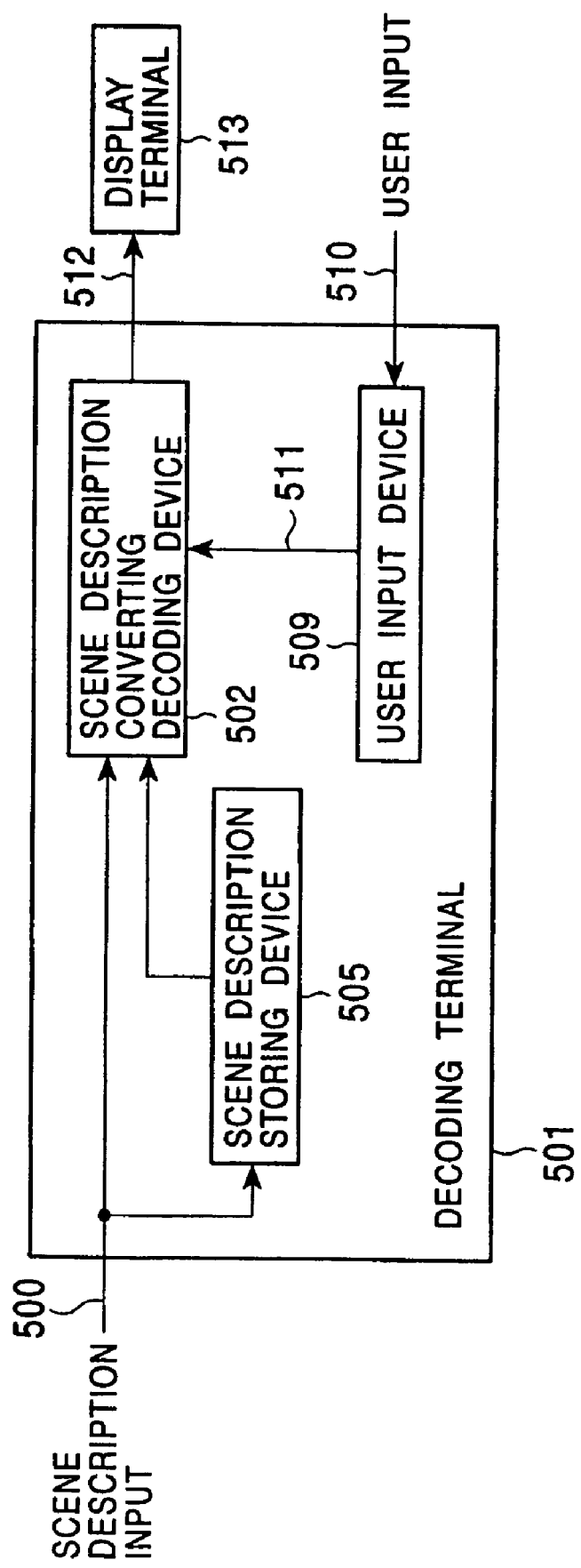
FIG. 7 is a block diagram representing a scene description audio-visual system corresponding to a third embodiment.

A third embodiment of the present invention will be described with reference to FIG. 7.

In the third embodiment, the decoding terminal 501 has a converting decoding device 502 which converts and decodes input scene description 500 and sends the converted decoded scenes 512 to the display terminal 513, a scene description storing device 505 for storing input scene description 500 and sending this to the scene description converting decoding device 502, and a user input device 509 for receiving user input 510 and sending user input information 511 to the scene description converting decoding device 502.

The display device 513 displays the converted decoded scenes 512 sent from the decoding terminal 501.

The difference with the first and second embodiments is that instead of converting the scene description 500 and outputting this as converted scene description, the scene description converting decoding device 502 within the decoding terminal 501 containing the scene description converting functions performs both converting and decoding. That is to say, parts containing interaction are extracted in the same manner as with the description made regarding the first embodiment, and decoding is also performed at the same time. The method for extracting the parts containing interaction is the same as that in the first embodiment. The scene description converting decoding device 502 enables displaying the converted decoded scenes 512 consisting only of parts of the interaction of the scene description being input on the display terminal 513.

A fourth embodiment of the present invention will be described with reference to FIG. 8.

In the fourth embodiment, a scene description generating device 615 has a scene description encoding device 616 which encodes input scenario 614 to form scene description 600, a scene description storing device 617 for storing the scene description 600 from the scene description encoding device 616, and a scene description data distributing device 618 for distributing the scene description 600 sent from the scene description encoding device 616 and scene description storing device 617 via a recording medium 619 or sending medium 620.

The server re-distributing server, and decoding terminal 601 receive the scene description 600 distributed via the recording medium 619 or sending medium 620.

In the third embodiment, the decoding terminal 501 has a scene description converting decoding device 502 which converts and decodes input scene description 500 and sends the converted decoded scenes 512 to the display terminal 513, a scene description storing device 505 for storing input scene description 500 and sending this to the scene description converting decoding device 502, and a user input device 509 for receiving user input 510 and sending user input information 511 to the scene description converting decoding device 502.

The display device 513 displays the converted decoded scenes 512 sent from the decoding terminal 501.

The fourth embodiment relates to the scene description generating device 615 which generates scene description. The scene description generating device 615 has a scene description encoding device 616, takes scenario 614 as input regarding what sort of scene is to be described, and generates the scene description 600. The scene description 600 may be either text data or binary data, depending on the case. The scene description 600 may also be stored in the scene description storing device 617. The generated scene description 600 is input to the server 101 shown in FIG. 1, the re-distributing server 401 shown in FIG. 6, and the decoding terminal 501 shown in FIG. 7, via the recording medium 619 or sending medium 620.

The scene description encoding device 616 according to the present embodiment determines beforehand the parts to be deleted and the parts to be left so as to be distinguishable, for the time of converting scene description at the server which receives scene description, the re-distribution server, and the decoding terminal.

Figure 10:
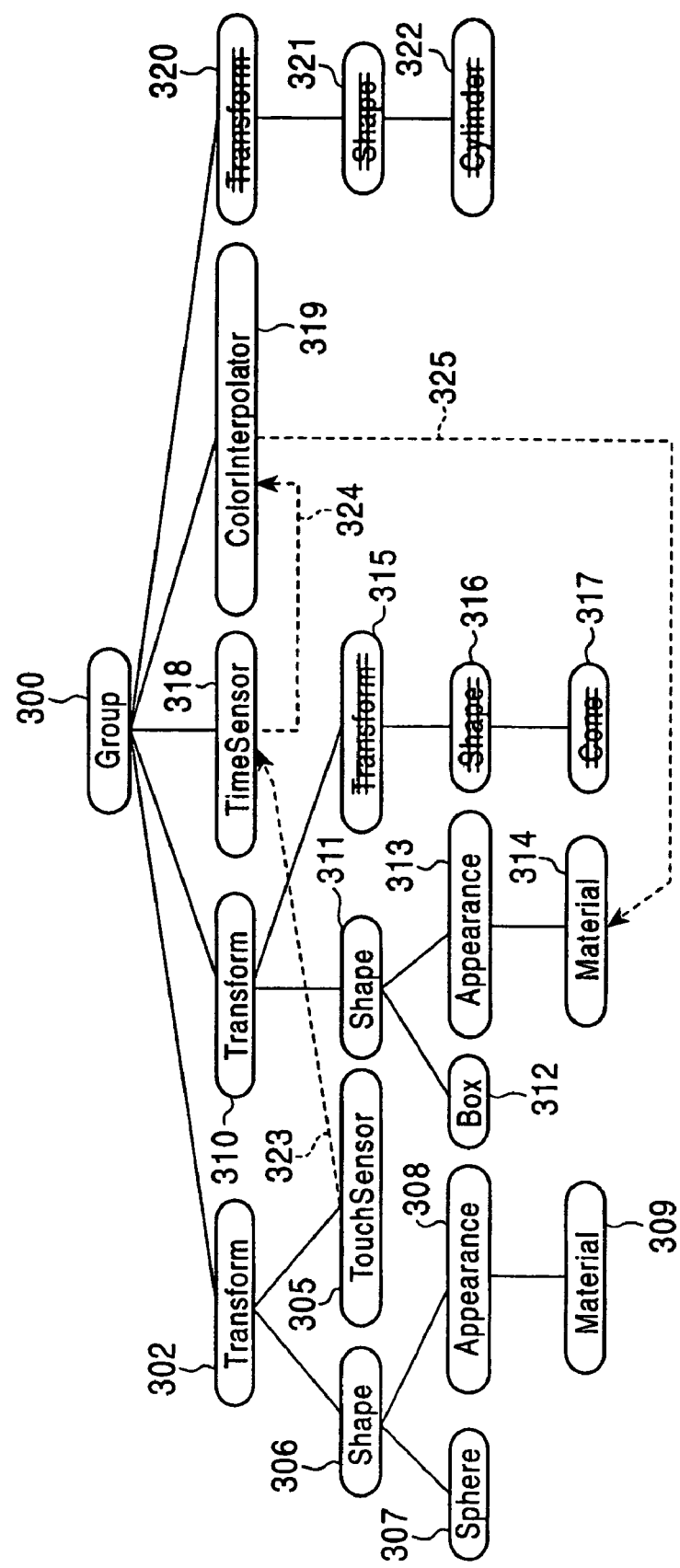
FIG. 10 is a diagram illustrating the scene description structure before and after scene description corresponding to the fourth embodiment.
Figure 11:
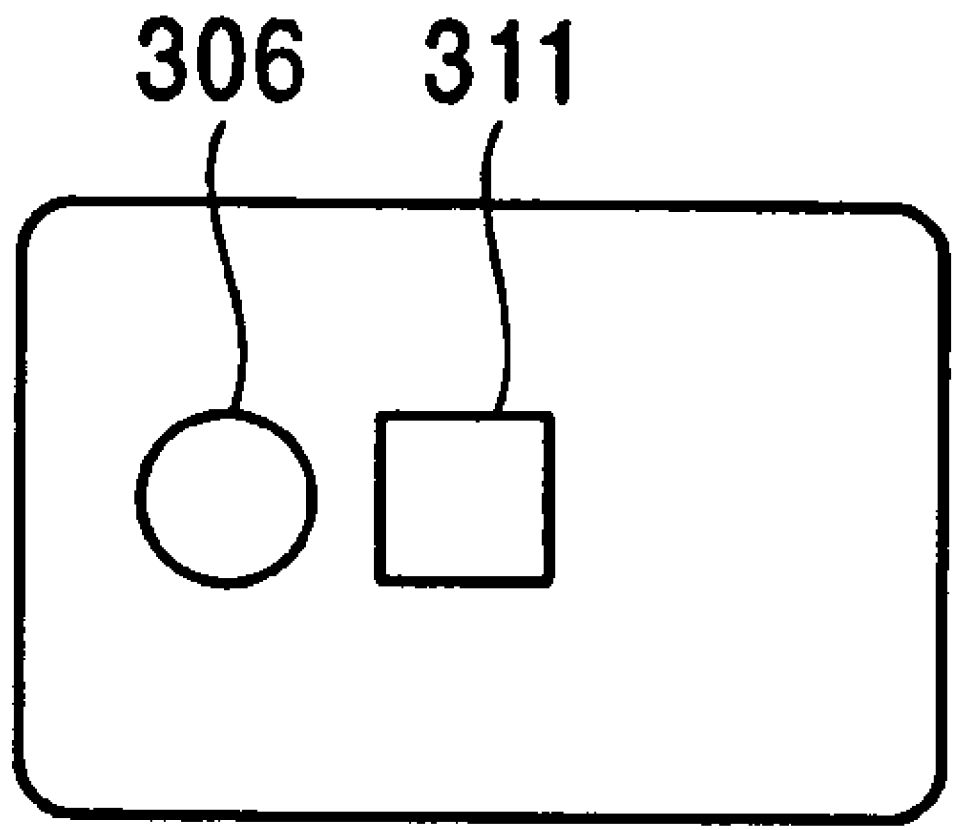
FIG. 11 is a diagram illustrating the converted scene description decoding and display results corresponding to the fourth embodiment.

FIGS. 9 through 11 describe scene description output by the scene description encoding device according to the present invention, taking VRML as an example. For the sake of description, the scene description is the same between FIG. 3 and FIG. 18. The scene description encoding device according to the fourth embodiment attaches identifiers beforehand to parts to be deleted at the scene description converting device or scene description converting decoding device. FIG. 9 shows that the Transform node 315 to which an identifier REM1 has been attached, the Transform node 320 to which an identifier REM2 has been attached, and all children nodes thereof, are to be deleted. Either the scene description converting device outputs the identifiers attached to the nodes to be deleted along with the scene description, or identifiers predetermined with the scene description converting device or scene description converting decoding device beforehand is used, thereby enabling the scene description converting device or scene description converting decoding device to judge which parts of the scene description input to leave, and which parts to delete. Due to the scene description generating device according to the present embodiment, the converting processing of the scene description at the scene description converting device or scene description converting decoding device does not require processing such as described in FIG. 2, meaning that conversion can be performed easily. Further, there is the advantage that the scene description following conversion can be determined at the time of generating the scene description, regardless of whether interaction is contained or not. For example, in the scene description shown in FIG. 9, not attaching the identifier REM2 to the Transform node 320 would allow the cone of the Shape node 321 which is unrelated to interaction to be displayed as the converting and decoding results of the scene description converting device or scene description converting decoding device.

FIG. 10 illustrates the structure of the scene description before and following conversion. The Transform node 320 to which the identifier REM1 is attached, and all the children nodes thereof, are deleted.

FIG. 11 shows the decoding and displaying results of the decoded scene description. As with the case of FIG. 5, the user interaction wherein the color of the cube 311 consecutively changes from RGB=[000] to RGB=[111] for one second after the user selecting the sphere 306 is saved even after conversion.

The present embodiment is not dependent on the type of scene description method. Rather, the present embodiment is effective in all scene description methods wherein identifiers capable of differentiating parts to be deleted or parts to be left can be embedded in the scene description. For example, with MPEG-4 BIFS, the same advantages can be had by using a nodeID stipulated in ISO/IEC14496-1 as the above identifier.

The fifth embodiment of the present invention will be described with reference to FIGS. 12 through 14.

Figure 8:
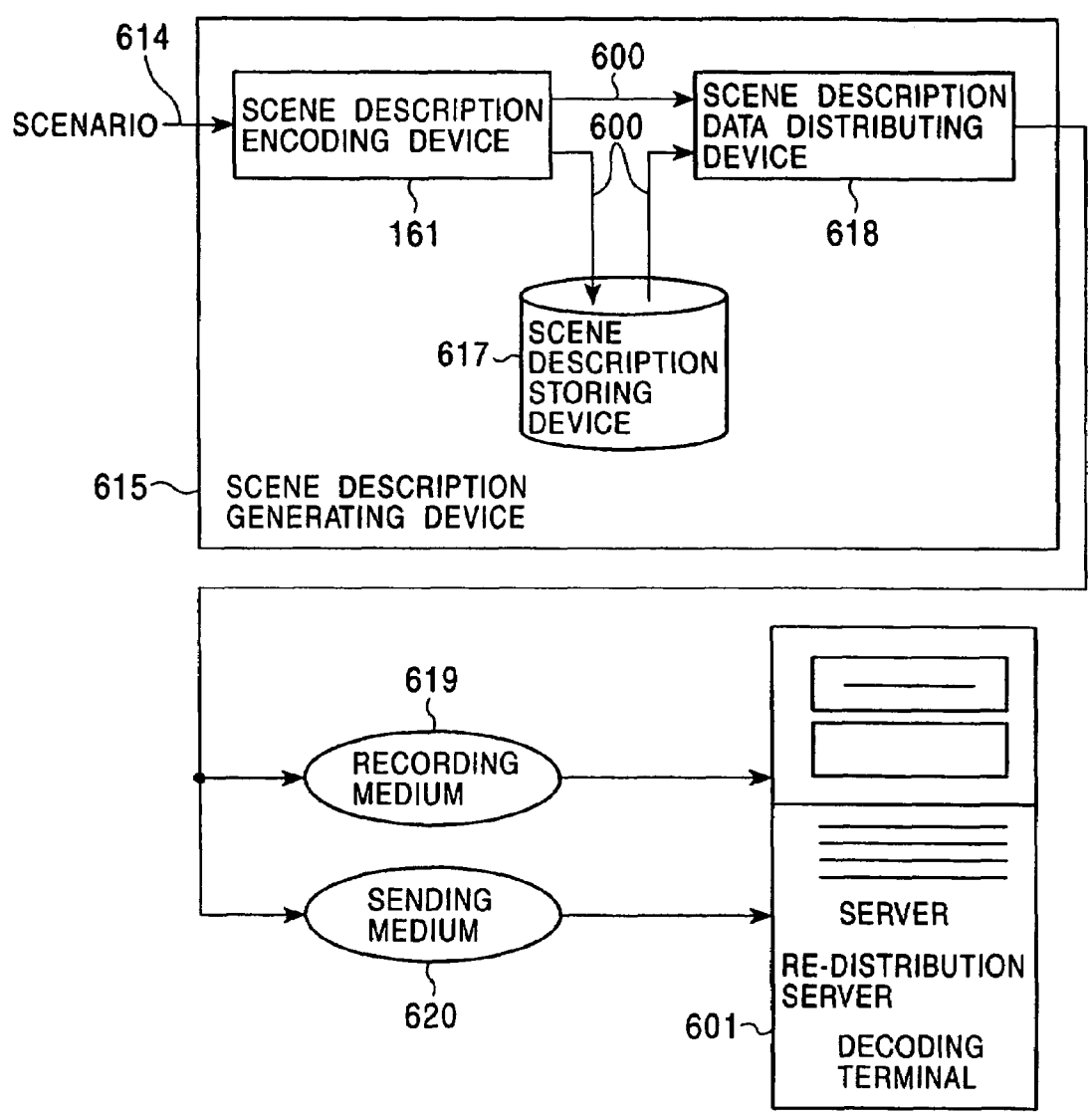
FIG. 8 is a block diagram representing a scene description generating device corresponding to a fourth embodiment.

The fifth embodiment relates to a scene description generating device for generating scene description, and the configuration of the scene description generating device is the same as that shown in FIG. 8 with the fourth embodiment. However, the scene description encoding device according to the fifth embodiment outputs parts to be left by conversion and parts to be deleted, as separate data beforehand, instead of embedding identifiers for scene description conversion in the scene description.

Figure 12:
FIG. 12 is a diagram illustrating an example of scene description according to a fifth embodiment.

FIGS. 12 through 14 describe scene description output by the scene description encoding device according to the fifth embodiment, taking VRML as an example. For the sake of description, the scene description contents are the same between FIG. 3, FIG. 9, and FIG. 18. The scene description encoding device according to the fifth embodiment outputs scene description with the data to be left and data to be deleted by the scene description converting device or scene description converting decoding device as data separated beforehand, as shown in FIGS. 12 and 13A-13B. The VRML inline node makes reference to the scene description of the external data using the URL (Uniform Resource Locator), and takes it in. The scene description shown in FIG. 12 makes reference to the scene description data1 shown in FIG. 13A by the inline node 315*b*, and the scene description data2 shown in FIG. 13B by the inline node 320*b*, respectively. The scene description converting device or scene description converting decoding device taking as input the three sets of scene description data shown in FIGS. 12 and 13A-13B is capable of using all three sets of scene description to obtain the scene description decoding results shown in FIG. 14A, or use only the scene description shown in FIG. 12 to obtain the scene description decoding results shown in FIG. 14B. Further, only the scene description shown in FIG. 13A may be deleted to delete only the cone 316 from the scene description decoding results shown in FIG. 14A. Note that the present embodiment is equally effective in deleting either the part which makes reference to the inline node or the part which is referred to.

The scene description converting device outputting the data identifiers for identifying scene description data to be deleted or to be left, along with the scene description, or using data identifiers predetermined with the scene description converting device or scene description converting decoding device beforehand, enables the scene description converting device or scene description converting decoding device to judge which scene description of multiple input scene descriptions to leave, and which scene description to ignore. The data identifiers may be either file names of scene description data, or in the event of forming packets of the data may be any identifier whereby packets can be identified.

Figure 15:
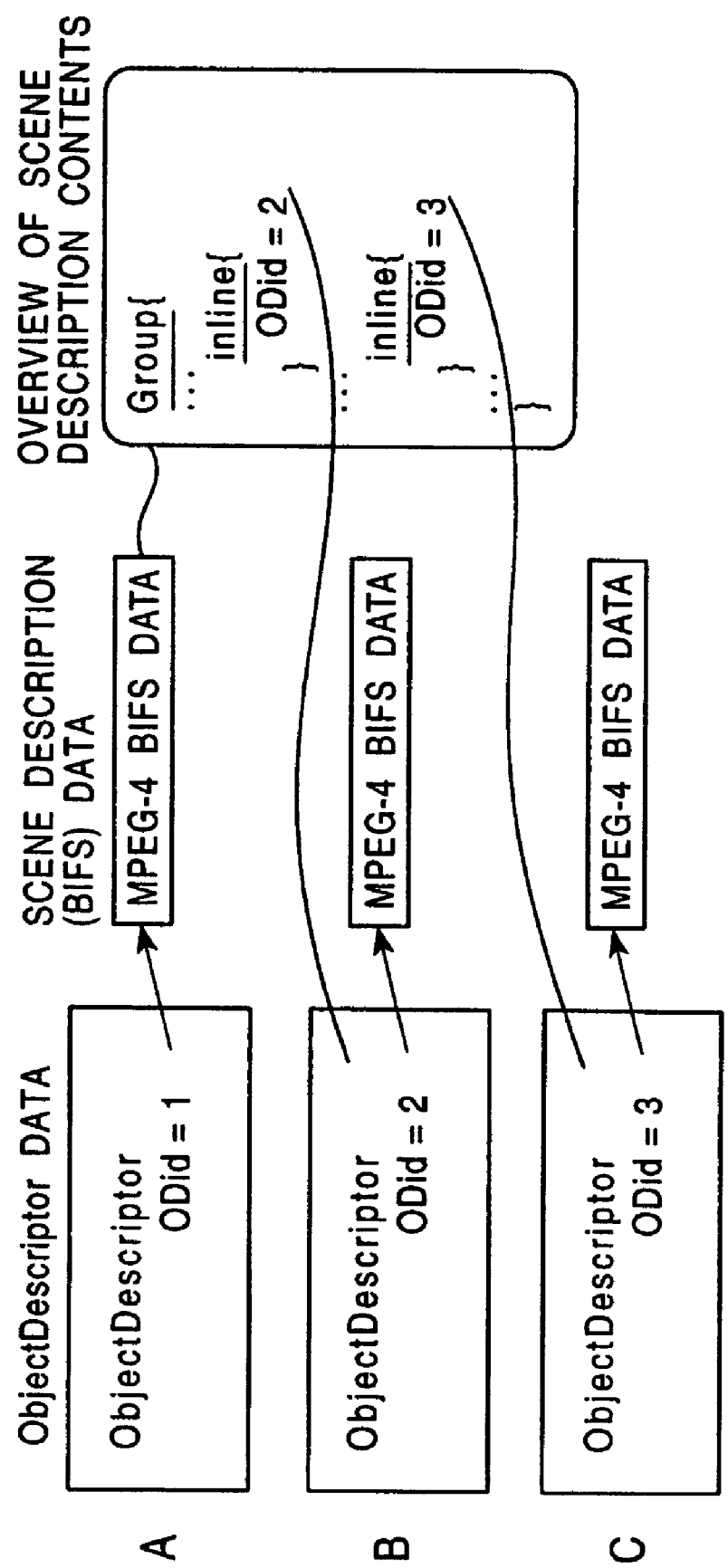
FIG. 15 is a block diagram illustrating an example of using 0Did stipulated in ISO/IEC14496-1 as a data identifier in the fifth embodiment.

An example of using 0Did, which is the identifier for ObjectDescriptor stipulated in ISO/IEC14496-1, as the above data identifier is shown in FIG. 15. The inline node in the scene description (BIFS) can specify the scene description (BIFS) data to be read in with the unique identifier 0Did. 0Did is an ID appropriated to each descriptor called ObjectDescriptor, and information relating the object to which reference is made is contained in the ObjectDescriptor data, of which scene description (BIFS) data to use. Accordingly, 0Did can be used as a data identifier with the present embodiment.

The scene description (BIFS) corresponding to the ObjectDescriptor data of 0Did=1 shown by A in FIG. 15 is MPEG-4 BIFS data equivalent to FIG. 12. The scene description (BIFS) corresponding to the ObjectDescriptor data of 0Did=2 shown by B in FIG. 15 is MPEG-4 BIFS data equivalent to FIG. 13A. The scene description (BIFS) corresponding to the ObjectDescriptor data of 0Did=3 shown by C in FIG. 15 is MPEG-4 BIFS data equivalent to FIG. 13B.

With the example shown in FIG. 15, the scene description (BIFS) data of 0Did=2 and 0Did=3 can be deleted at the time of converting the scene description, either by the scene description generating device outputting information to delete the scene description (BIFS) data of 0Did=2 and 0Did=3, or by predetermining with the scene description converting device or scene description converting decoding device beforehand.

Also, even without using data identifiers, outputting divided scene description as other data beforehand using the scene description generating device according to the present embodiment is effective in facilitating conversion processing by the scene description converting device or scene description converting decoding device selecting and outputting appropriate scene description data dependent on the sending capacity usable for re-distribution of the converted scene description or capabilities of the decoding and display devices.

According to the scene description generating device of the present embodiment, conversion processing by the scene description converting device or scene description converting decoding device does not need processing such as shown in FIG. 2; rather, simply ignoring the scene description data to be deleted allows conversion to be performed easily.

This is further advantageous in that scene description following conversion can be determined at the time of generating the scene description, regardless of whether or not interaction is contained therein.

Further, dividing the scene description data into multiple sets allows the scene description which is the output of the scene description data distributing device 618 to be recorded on an arbitrary recording medium, sent via an arbitrary sending medium, and the two to be arbitrarily mixed, as shown in FIG. 8. For example, an arrangement may be made wherein one set of scene description data is distributed by a sending medium for TV broadcasting, another set of scene description data is recorded to a recording medium such as DVD, and both are used in a combined manner at a server, re-distributing server, or a decoding terminal.

The sixth embodiment of the present invention will be described with reference to FIGS. 16 and 17A-17B.

The sixth embodiment relates to the scene description generating device for generating scene description, with the configuration of the scene description generating device being the same as that shown in FIG. 8 with the fourth embodiment. However, the scene description encoding device according to the sixth embodiment does away with the need for conversion processing by outputting only the parts to be left by conversion as other data beforehand.

Figure 17A:
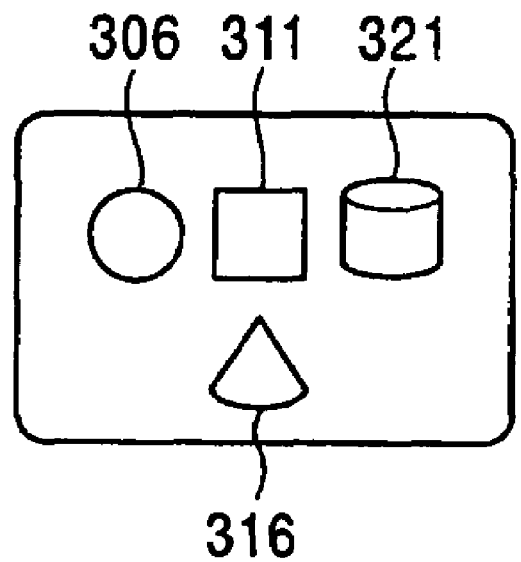
FIG. 17 is a diagram illustrating the scene description data decoding and display results corresponding to the sixth embodiment.
Figure 17B:
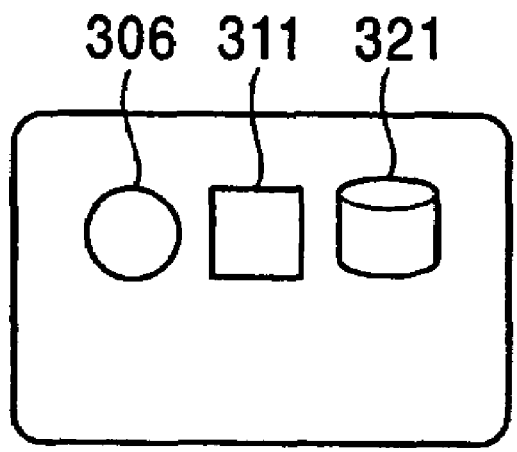
Figure 19:
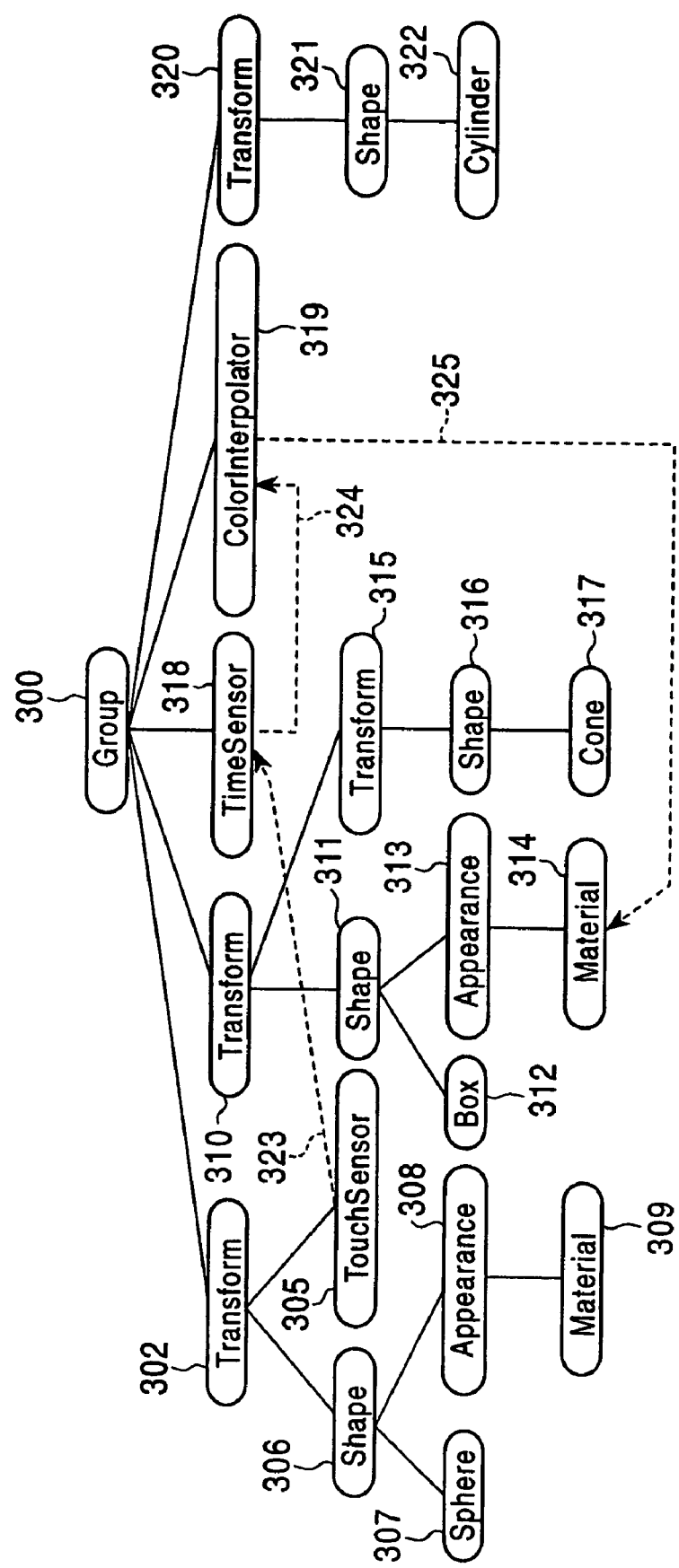
FIG. 19 is a diagram illustrating the structure of scene description.
Figure 20:
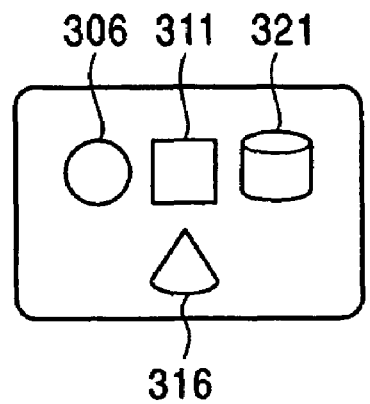
FIG. 20 is a diagram illustrating scene description decoding and display results.
Figure 21:
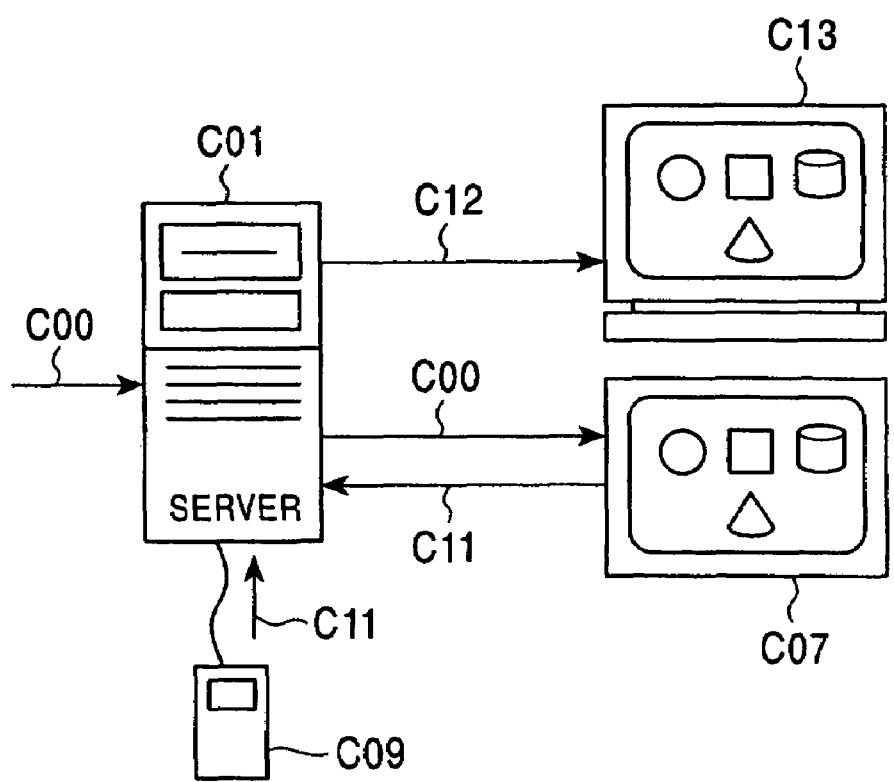
FIG. 21 is a diagram illustrating an example of a system at the time of viewing and listening to conventional scene description.

FIGS. 16 and 17A-17B describe scene description output by the scene description encoding device according to the sixth embodiment, taking VRML as an example.

The entire FIG. 16 is a scene description contained in the scene description data D1, and the scene description data D2 in FIG. 16 represents a scene description part contained in the scene description data D1. The scene description encoding device according to the sixth embodiment outputs both the scene description data D1 and scene description data D2. Decoding and displaying only the scene description data D1 yields that shown in FIG. 17A, and decoding and displaying only the scene description data D2 yields the shown in FIG. 17B with the cone removed. The scene description of the scene description data D1 and the scene description of the scene description data D2 can each be independently decoded and displayed, so all that is necessary for the scene description converting device or scene description converting decoding device is to select one of the scene descriptions.

The scene description encoding device outputting the data identifiers for identifying the scene description data to be selected by the scene description converting device or scene description converting decoding device along with the scene description, or using identifiers predetermined with the scene description converting device or scene description converting decoding device beforehand, enables the scene description converting device or scene description converting decoding device to judge which of the multiple scene descriptions to use alone. The data identifiers are of the same format as that described with the fifth embodiment.

With the scene description encoding device according to the sixth embodiment, there is absolutely no need for the scene description converting device or scene description converting decoding device to perform any conversion processing relating to the contents of scene description. Accordingly, the output of the scene description converting device or scene description converting decoding device can be decided at the stage of generating scene description, regardless of whether or not there is interaction, and optimal scene description can be created according to the sending capacity for sending the converted scene description and the decoding and display capabilities.

Further, as with the fifth embodiment, dividing the scene description data into multiple sets allows the scene description which is the output of the scene description data distributing device 618 to be recorded on an arbitrary recording medium, sent via an arbitrary sending medium, and the two to be arbitrarily mixed, as shown in FIG. 8.

Thus, the present embodiment relates to generating of scenes comprising still image signals, motion image signals, audio signals, text, data, graphics data, etc., and containing interaction wherein input from users is received, and to user input thereof, and also to equipment control. This art is suitably applied to, for example, performing user input at the receiving side, interacting with scenes, controlling equipment, etc., at the time of playing from recording media such as magneto-optical disks, magnetic disks, or magnetic tape, and displaying on a display or receiving contents of the Internet and broadcasts.

The present embodiment enables decoding and display to be made with terminals having inferior decoding capabilities or display capabilities, by performing conversion wherein only partial scene description relating to user interaction is extracted, at the time of viewing and listening to contents made up of scenes containing interaction from user input, such as digital TV broadcasts and DVD, HTML, MPEG-4 BIFS, VRML, and so forth. Also, scene descriptions are generated beforehand assuming that scene description conversion will be performed later, so the contents of scene description following scene description conversion can be controlled at the stage of generating the scene descriptions, thus facilitating conversion.

Note that all of the embodiments can be realized by hardware or by software.

As described above, there have been demands for decoding and displaying with terminals having inferior decoding capabilities and display capabilities regarding viewing and listening to contents described with scene description enabling interaction by user input to be contained therein. Also, there have been problems in that scene descriptions with large amounts of data cannot be sent, or sending media with great capacity is needed, for re-distributing using sending media with small capacity.

According to the present invention, conversion is performed wherein only partial scene descriptions relating to user interaction are extracted from the scene description input containing user interaction, thereby enabling decoding and displaying with terminals having inferior decoding capabilities and display capabilities. Alleviating the amount of data of the scene description is advantageous in that the sending capacity necessary for sending and re-distributing the scene description can be suppressed to a low level.

Performing conversion which leaves parts relating to user interaction enables providing of a user interface system capable of maintaining user interaction the same as before conversion with remote terminals having user input functions, as well.

Also, with the present invention, generating scene description such as to facilitate identifying parts to be deleted and parts to be left beforehand, by assuming that conversion of scene description according to the present invention will be performed later, allows the contents of scene description following scene description conversion to be controlled at the stage of generating the scene description. This is advantageous in that the scene description conversion processing is simplified.

Further, outputting beforehand, at the time of generating, the parts to be extracted at the time of conversion as other scene description data, or outputting both scene description before conversion and after conversion, facilitates easy conversion since all that is necessary at the time of conversion is to select the scene description data. This is also advantageous in that screen description following conversion can be decided at the time of generating the screen description, regardless of whether interaction is contained therein or not. Also, dividing the scene description data into multiple sets allows the scene description which is the output of the scene description generating device to be recorded on an arbitrary recording medium, sent via an arbitrary sending medium, and be arbitrarily mixed.

What is claimed is:

1. A user interface system using scene description information including user interaction, said system comprising:
   a server having converting means for converting scene description information; and
   a remote terminal having decoding means for decoding scene description information and display means for displaying scenes;
   wherein said server sends scene description information converted by the converting means thereof to said remote terminal, and said remote terminal decodes with the decoding means thereof and displays on the display means thereof, the converted scene description information, and wherein said converting means leaves portions describing user interaction regarding said scene description information, and converts other portions so as to be deleted;
   wherein said remote terminal has input means to which user input information is input;
   and wherein said remote terminal sends to said server user input information that is input to said input means according to a scene displayed on the display means thereof;
   and wherein said server performs conversion at the converting means thereof based on the user input information.

2. A user interface system according to claim 1, wherein said portions describing user interaction are portions necessary for generation, propagation, reception, or execution of events.

* * * * *